United States Patent [19]

Kanda

[11] Patent Number: 4,535,367
[45] Date of Patent: Aug. 13, 1985

[54] MAGNETIC RECORD STILL MODE REPRODUCTION APPARATUS AND METHOD

[75] Inventor: Shuhei Kanda, Yokohama, Japan

[73] Assignee: Tokyo Shibaura Denki Kabushiki Kaisha, Kawasaki, Japan

[21] Appl. No.: 563,547

[22] Filed: Dec. 21, 1983

Related U.S. Application Data

[63] Continuation of Ser. No. 293,939, Aug. 18, 1981, abandoned.

[30] Foreign Application Priority Data

Aug. 28, 1980 [JP] Japan ............................ 55-118741

[51] Int. Cl.³ ............................................ H04N 5/783
[52] U.S. Cl. .................................. 360/10.2; 360/10.3; 360/21; 360/84; 360/73
[58] Field of Search .................... 360/10.3, 10.2, 10.1, 360/11.1, 21, 84, 73, 33.1, 107, 77

[56] References Cited

U.S. PATENT DOCUMENTS

| | | | |
|---|---|---|---|
| 3,678,186 | 7/1972 | Narita | 360/10.2 |
| 4,197,562 | 4/1980 | Kikuya et al. | 360/64 |
| 4,241,365 | 12/1980 | Koda | 360/73 |
| 4,246,616 | 1/1981 | Hiraguri | 360/10.2 |
| 4,307,417 | 12/1981 | Tokuyama | 360/10.1 |
| 4,317,140 | 2/1982 | Warren | 360/21 |
| 4,328,518 | 5/1982 | Kawata | 360/10.3 |

FOREIGN PATENT DOCUMENTS

| | | | |
|---|---|---|---|
| 2449423 | 1/1976 | Fed. Rep. of Germany | 360/73 |
| 2835837 | 2/1978 | Fed. Rep. of Germany | 360/75 |
| 2823470 | 12/1978 | Fed. Rep. of Germany | 360/75 |
| 53-17014 | 2/1978 | Japan | 360/10.3 |

Primary Examiner—Alan Faber
Attorney, Agent, or Firm—Cushman, Darby & Cushman

[57] ABSTRACT

A reproduction device for a helical scanning type video tape recorder with a head section comprises upper and lower immovable cylinders and a head drum rotatably set between the cylinders. A magnetic tape slides along the peripheral surface of the head section. The head drum is rotated by a head drive section at a prescribed speed. The running speed of the magnetic tape is controlled by a capstan, which is mechanically connected to a capstan device section. Two exclusive special reproduction heads are mounted on the peripheral surface of the head drum. The special reproduction heads are mounted on the peripheral surface at different heights as viewed from the direction in which the rotary shaft of the head drum extends. The height difference is chosen to be smaller than the pitch of the respective adjacent tracks formed on the magnetic tape in accordance with the azimuth recording process.

29 Claims, 20 Drawing Figures

MAGNETIC RECORD STILL MODE REPRODUCTION APPARATUS AND METHOD

This is a continuation of application Ser. No. 293,939, filed Aug. 18, 1981, now abandoned.

BACKGROUND OF THE INVENTION

This invention relates to a reproduction device for a helical scan type of magnetic record-reproduction apparatus and more particularly to a slow reproduction device for a heical scan type of video tape recorder.

In a conventional helical scan type of video tape recorder, an azimuth recording method is adopted for recording image signals on a magnetic tape without guard bands extending between the adjacent recording tracks. For this azimuth recording, two reproduction heads (as referred to normal reproduction heads), which are respectively set at first and second azimuth angles, are mounted on the peripheral portion of a rotary disc-shaped head drum at angle of 180°. As disclosed in U.S. Pat. No. 4,246,616, the normal reproduction heads are also used to reproduce slow motion pictures. However, the slow motion pictures obtained by the heads are not satisfactory. On the other hand, Japanese Patent Disclosures (KOKAI) Nos. 53-17014 and 53-17315 show a video tape recorder having additional two heads (as referred to special reproduction heads) for special reproduction purpose, such as for the quick motion reproduction and still picture reproduction. These additional heads are set at the aforesaid second azimuth angle and are mounted on the peripheral portion of the head drum at an angle of 180°. The additional heads improve the quality of picture in still motion and quick production, however the picture quality in slow motion is still unsatisfactory.

SUMMARY OF THE INVENTION

It is accordingly the object of this invention to provide a reproduction device for a helical scanning type of magnetic record-reproduction apparatus, which prevents a decrease in the quantity of image signals issued during the special reproduction period, particularly during the slow picture reproduction period.

A reproduction device of this invention comprises at least two heads respectively having prescribed azimuth angles. The heads reproduced image signals recorded on video tracks having the same azimuth angles as those of the heads. The video tracks are formed at a prescribed pitch on the recording medium which travels, by speed control means, in prescribed periods through alternate switching to one of the first and second speeds. While the recording medium is controllably set to the first speed, the heads move on the surface of the recording medium so as to form mutually parallel loci with a prescribed distance left therebetween. The distance between the loci on the recording medium is selected to be smaller than one pitch of the video track, but larger than zero.

DETAILED DESCRIPTION OF THE PREFERRED EMBODIMENTS

Figure 1:
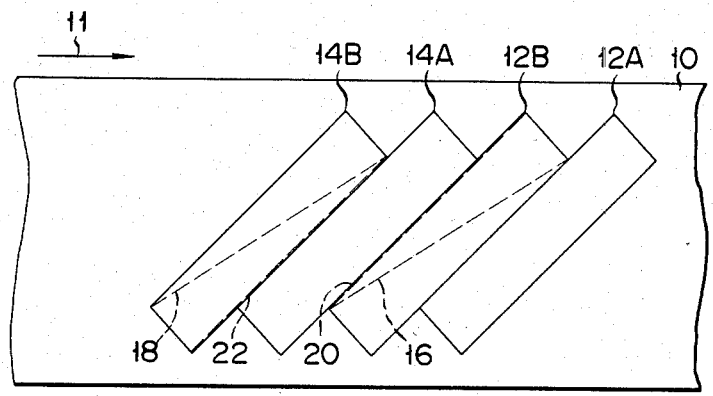
FIG. 1 shows the loci of the central points of the reproducing heads of the prior art reproducing device tracing the recording tracks of a magnetic tape.

Referring now to FIG. 1, there is illustrated a conventional video tape recorder with special reproduction heads.

Two different image signals are recorded on a magnetic tape 10 by the azimuth recording system, then video tracks or recording tracks 12A, 12B, 14A, 14B are formed obliquely of the magnetic tape 10. Image signals of one field are recorded on tracks 12A, 14A, ... which are collectively referred to as "an A field". Similarly, image signals of the other field are recorded on tracks 12B, 14B, ... which are collectively referred to as "a B field". Tracks 12A, 14A, ... of A field define a first azimuth angle different from a second azimuth angle defined by tracks 12B, 14B, ... of B field.

The slow reproduction included in the special reproduction process comprises the still and normal reproduction of the image signals of, for example, B field. Said normal reproduction is particularly referred to as "a normal speed reproduction" in distinction from the normal reproduction (normal mode reproduction) applied to the special reproduction process. The slow reproduction is carried out by reproducing the image signals of B field in the still mode and reproducing those of the same field in the normal speed mode alternately only by means of the aforementioned special reproduction heads. Now let it be assumed that the special reproduction heads are so arranged that their imaginary center lines extending in the rotating direction of the disc drum are aligned with the imaginary circumference of the drum. Then the loci of the center points of the respective special reproduction heads tracing the tracks may be indicated by dotted lines 16, 18, 20, 22 given in FIG. 1. Dotted lines 16, 18 represent the loci of the center points of the special reproduction heads tracing the stopped tape at the time of still reproduction. Dotted lines 20, 22 denote the loci of the center points of the special reproduction heads tracing the tape running at a normal speed at the time of the previously defined normal speed reproduction. In other words, the special reproduction heads trace track 12B along line 16 (at this time the tape stands at rest). Thereafter, the heads trace the tape along lines 20, 22 (at this time the tape runs at a normal speed). Then the heads trace track 14B along line 18 (at this time the tape is again brought to rest). The special reproduction heads which define the second azimuth angle reproduce only B field image signals from tracks 12B, 14B, . . . which also define the second azimuth angle.

Figure 2:
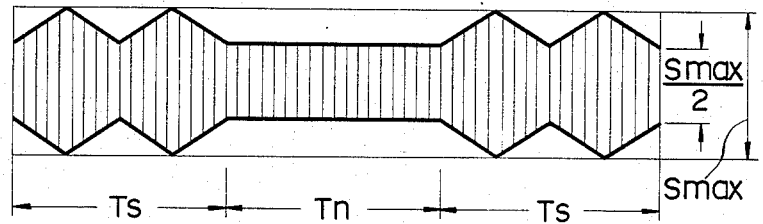
FIG. 2 illustrates a waveform of an image signal reproduced from the tracks according to the loci of the central points of the reproducing heads of FIG. 1.
Figure 3:
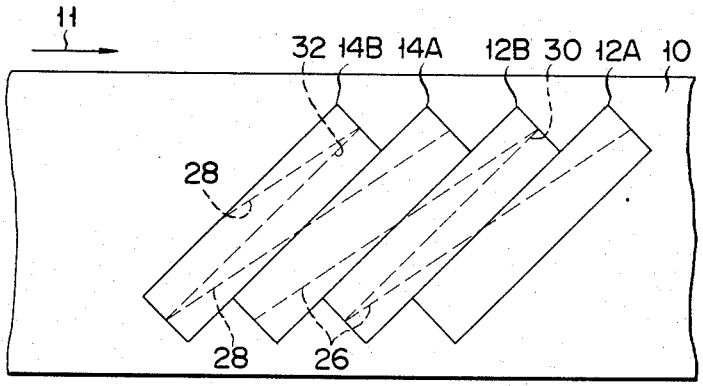
FIG. 3 indicates the other loci of the central points of the reproducing heads of the prior art reproducing device tracing the recording tracks of a magnetic tape.

An image signal produced at the slow reproduction has an envelope wave shape shown in FIG. 2. Even period Ts given therein corresponds to that of still reproduction. The envelope wave shape of an image signal reproduced at this time has a maximum value Smax in the period Ts. A period Tn corresponds to the previously defined normal speed reproduction period. An image signal reproduced during Tn period has an envelope wave shape substantially equal to half the maximum value Smax. The reason is that during the period Tn of said normal speed reproduction, the special reproduction heads trace the tracks along dotted lines 20, 22 of FIG. 1, namely, trace only substantially half the areas of tracks 12B, 14B. Therefore, the prior art special reproduction device has the drawbacks that image signals generated at the slow reproduction decrease in quantity, increasing the noise component of a reproduced image and failing to provide a good picture.

Figure 4:
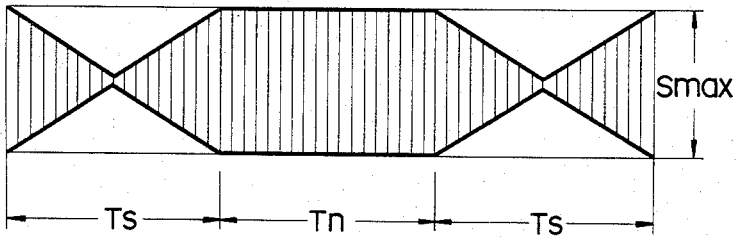
FIG. 4 indicates a waveform of an image signal reproduced from the tracks of a magnetic tape according to the loci of the central points of the reproducing heads of FIG. 3.

Description is now given to another case where the two diametrically arranged special reproduction heads are set at different heights as viewed in the direction of the rotary shaft of the disc drum. In this case, the central line of one of said two special reproduction heads is aligned with a first circumferential line of the disc drum. The central line of the other special reproduction head is aligned with a second circumferential line which is parallel with the first circumferential line. A distance between the first and second circumferential lines is chosen to be equal to single pitch of every adjacent tracks. Since, as described above, the two special reproduction heads are set at different heights as viewed in the direction of the rotary shaft of the disc drum, the central points of the two special reproduction heads respectively trace tracks 12B, 14B, . . . of B field along dotted lines 26, 28. During normal speed reproduction period Tn, the central points of the two special reproduction heads respectively trace tracks 12B, 14B, . . . of B field along dotted lines 30, 32. Image signals sent forth during the slow reproduction period have an envelope wave shape as illustrated in FIG. 4. An image signal issued during the normal speed reproduction period Tn has a maximum envelope wave shape Smax. Therefore, substantially all the image signals recorded on tracks 12B, 14B, . . . of B field are reproduced. At midpoint of still reproduction period Ts, however, substantially no image signals are reproduced. This results in the drawbacks that a reproduced image signal is contaminated by noises; and the S/N ratio falls, making it impossible to provide a good picture.

Figure 5:
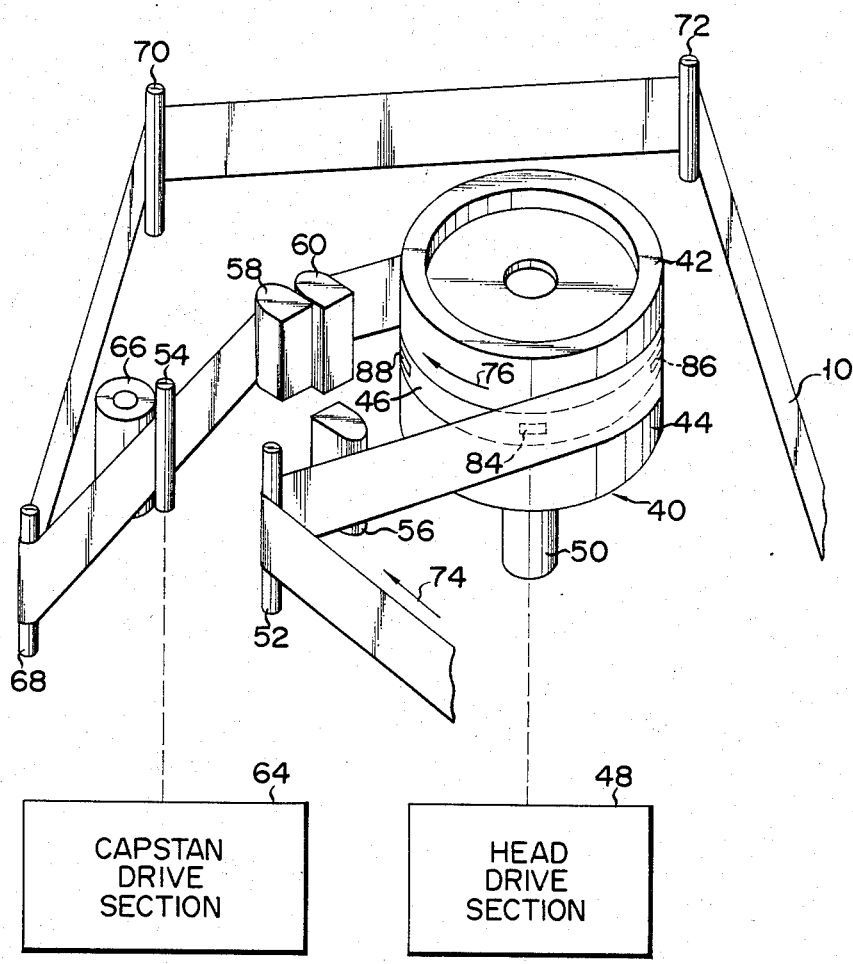
FIG. 5 is an oblique view of the main section of a reproducing device embodying this invention.

Description is now given with reference to FIG. 5 of a reproducing device according to this invention. A rotary head section 40 comprises an upper cylinder 42 and a lower cylinder 44, both of which are fixed in place. A disc-shaped head drum 46 has a prescribed thickness and is set between upper and lower cylinders 42, 44. Head drum 46 is mechanically coupled to a head-driving section 48 by means of its rotary shaft 50, and is rotated about rotary shaft 50 at a prescribed speed. Magnetic tape 10 wound about a feed reel provided in a cassette (not shown) is made to slidably contact at least over half the peripheral wall of rotary head section 40. A guide pin 52 and capstan 54 guide magnetic tape 10. A tracks-erasing head 56 is disposed between guide pin 52 and head section 40. A voice control head 58 and a voice erasing head 60 are provided between capstan 54 and head section 40. Capstan 54 is mechanically connected to a capstan drive section 64 and rotated at a prescribed speed. The opposite side to that on which magnetic tape 10 is slidably contacted by a rubber-edged pinch roller 66. In other words, tape 10 is clamped between capstan 54 and pinch roller 66. Tape 10 running between capstan 54 and pinch roller 66 is conducted by guide pins 68, 70, 72 to a takeup reel (not shown). Tape 10 travels to the direction indicated by an arrow 74 shown in FIG. 5. Rotary head 46 rotates to the direction indicated by an arrow 76 shown in FIG. 5.

Figure 6:
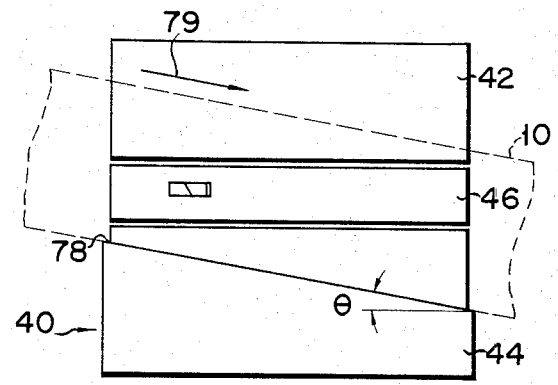
FIG. 6 is a lateral view of the head section of FIG. 5.

As shown in FIG. 6, a tape guide band 78 is formed around lower cylinder 44. Guide band 78 obliquely extends downward over the peripheral surface of lower cylinder 44 at an angle $\theta$ of inclination. Magnetic tape 10 slides over the peripheral surface of head section 40 obliquely downward in a direction indicated by an arrow 79 at an angle $\theta$.

Figure 7:
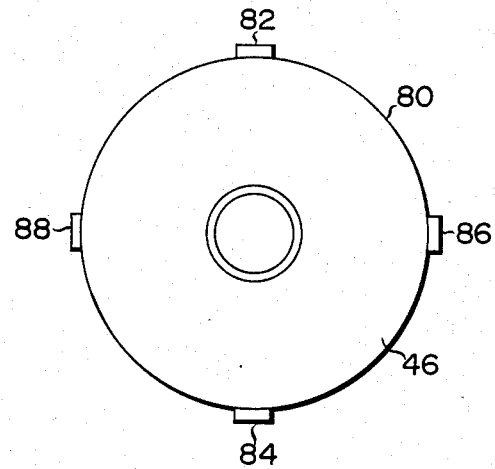
FIG. 7 is a plan view of the head drum of FIG. 5.

As shown in FIG. 7, two diametrically positioning video heads 82, 84 are mounted on the peripheral surface of head drum 46. These video heads respectively define first and second different azimuth angles and are used at the time of recording and normal reproduction other than special reproduction. Two other diametrically positioning video heads 86, 88 are also mounted on the peripheral surface of head drum 46. With the foregoing embodiment, a straight imaginary line extending between video heads 82, 84 and a straight imaginary line extending between video heads 86, 88 are chosen to intersect each other at right angles. The latter video heads 86, 88 individually define the second azimuth angle alike, and are used exclusively at the time of special reproduction.

Further with the foregoing embodiment, it will be noted that normal reproduction video heads 82, 84 occupy the same height on the peripheral wall of head drum 46, whereas special reproduction video heads 86, 88 are set at different heights on the peripheral wall of head drum 46.

Figure 8:
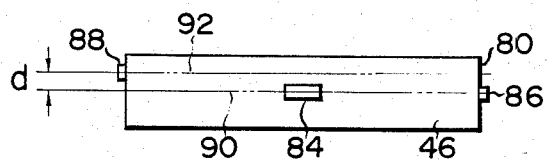
FIG. 8 is a lateral view of the head drum of FIG. 5.

FIG. 8 is a lateral view of head drum 46 of FIG. 7. Normal reproduction video heads 82, 84 and one special reproduction head 86 are aligned on first imaginary circumferential line 90, which is parallel with the end face of head drum 46. In other words, three video heads 82, 84, 86 are held at the same height on the peripheral wall of head drum 46 as viewed from the direction in which rotary shaft 50 (FIG. 1) of head drum 46 extends. The remaining special reproduction video head 88 is aligned with second imaginary circumferential line 92 of head drum 46 parallel with the first circumferential line thereof. A distance d between the first and second circumferential lines is defined as follows:

$$0 < d/P < 1 \tag{1}$$

where P=amount of one pitch between the respective adjacent tracks formed on a magnetic tape.

In FIG. 8, the above-mentioned distance d, assuming the width of heads to be equal to that of tracks, is chosen to have such a value as expressed, for example, by the following equation:

$$(d/P) \approx 0.2 \qquad (2)$$

Figure 9:
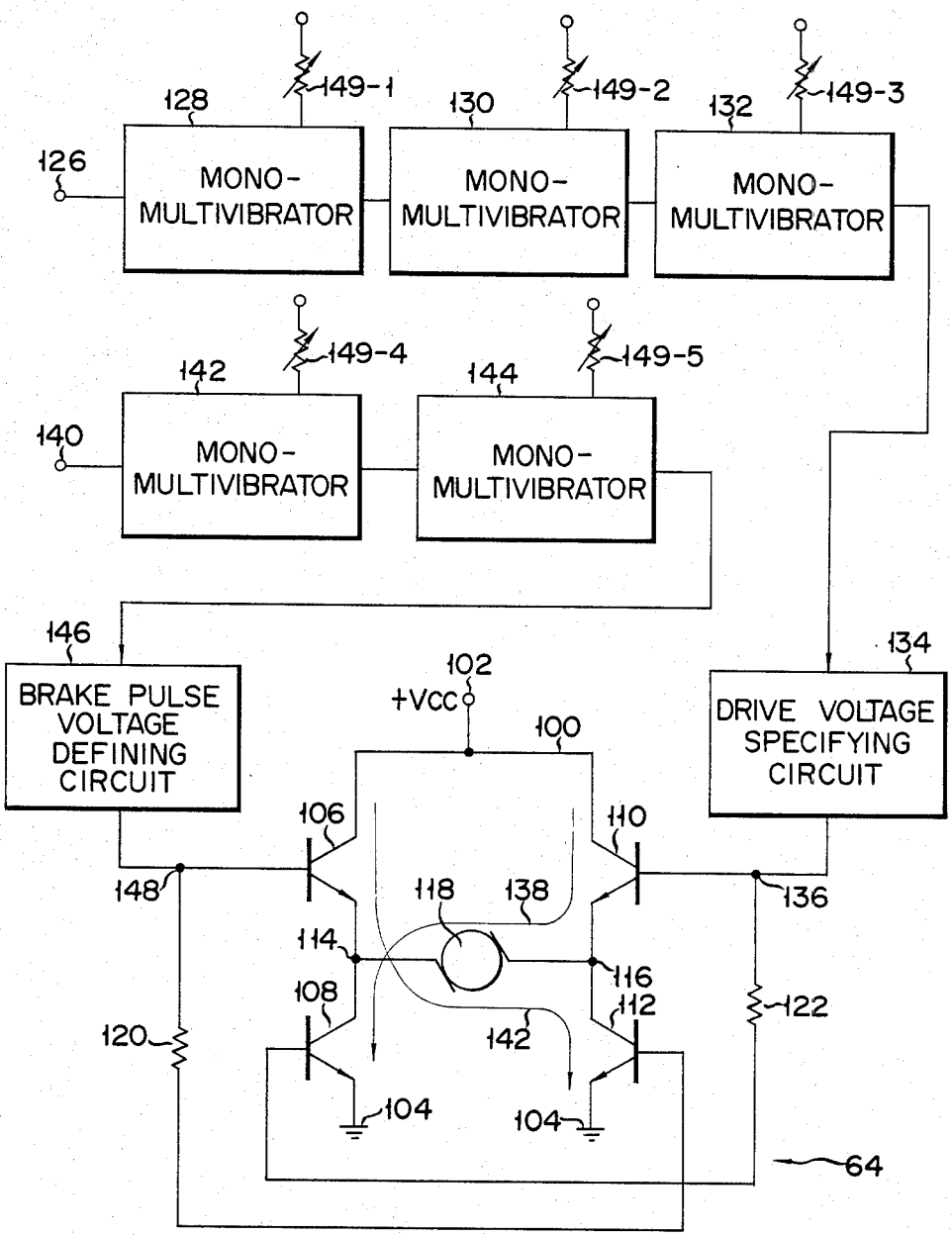
FIG. 9 is a schematic block circuit diagram of a capstan drive section of the reproducing device of FIG. 5 embodying the invention.

FIG. 9 is a block circuit diagram of capstan drive section 64 of FIG. 1. Four first to fourth transistors 106, 108, 110, 112 having the same polarity (for example, of the NPN type) are set between an earth 104 and a power supply line 100 connected to a terminal 102 impressed with power source voltage $+V_{CC}$. The collectors of first and third transistors 106, 110 are directly connected to power supply line 100. The emitters of first and third transistors 106, 110 are respectively connected to the collectors of second and fourth transistors 108, 112, whose emitters are grounded. A D.C. motor 118 is connected between a junction 114 of the emitter of first transistor 106 and the collector of second transistor 108 and a junction 116 of the emitter of third transistor 110 and the collector of fourth transistor 112. D.C. motor 118 is coupled to capstan 54 of FIG. 5 for its drive. The base of first transistor 106 is connected to the base of fourth transistor 112 through a resistor 120. The base of second transistor 108 is connected to the base of third transistor 110 through a resistor 122.

Figure 10:
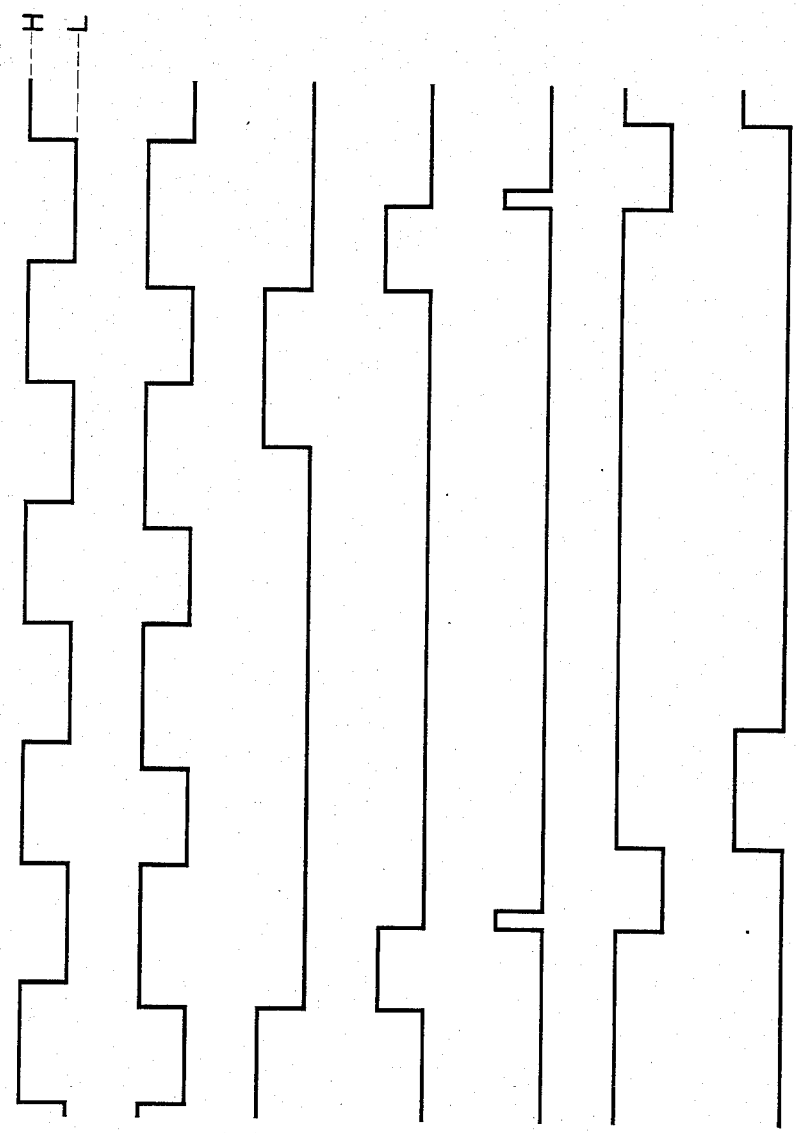
FIGS. 10A to 10G denote the waveforms of signals appearing at the various points of the capstan drive section of FIG. 9.

Reference numeral 126 denotes an input terminal of capstan drive section 64 of FIG. 1. To input terminal 126, a head-timing signal is supplied for determine the time point of exchanging between normal reproduction heads 82, 84. The head-timing signal is a pulse signal whose voltage changes between the high and low levels H, L as shown in FIG. 10A. Input terminal 126 of capstan drive section 64 of FIG. 1 is connected to a junction 136 of a resistor 122 and the base of third transistor 110 through three first to third mono-multivibrators 128, 130, 132 and drive voltage-specifying circuit 134. The head-exchanging signal of FIG. 10A supplied to input terminal 126 is transmitted to first mono-multivibrator 128, which determines the point of time at which magnetic tape 10 starts to be moved. First mono-multivibrator 128 sends forth an output signal shown in FIG. 10B, which is supplied to a second mono-multivibrator 130. Second mono-multivibrator 130 determines the slow running speed of magnetic tape 10 at the time of slow reproduction, and generates a signal shown in FIG. 10C, which is delivered to a third mono-multivibrator 132. Third mono-multivibrator 132 causes magnetic tape 10 to run at a speed, for example, about one time higher than that at which magnetic tape 10 travels at the time of the normal reproduction. Third mono-multivibrator 132 produces an output signal shown in FIG. 10D. Where the output signal of FIG. 10D is supplied to the bases of second and third transistors 108, 110 at least through drive voltage specifying circuit 134, then second and third transistors 108, 110 are rendered conducting in response to the H level pulse component of the output signal of FIG. 10D. As a result, current flows in a direction indicated by an arrow 138 given in FIG. 9, causing motor 118 to be driven in the normal direction. The torque moment of motor 118 is transmitted to capstan 54 of FIG. 1.

To an input terminal denoted by reference numeral 140 is supplied a reproduction control signal. This reproduction control signal is generated when pulse data which is corresponding to the location of track and recorded on magnetic tape 10 is read out by part of control head 58. An output signal from control head 58 is reshaped by the known means, causing the reproduction control pulse signal to have a waveform shown in FIG. 10E. However, the pulse width of this pulse signal is not limited to that of FIG. 10E. Input terminal 140 is connected to a junction 148 of resistor 120 and the base of first transistor 106 through fourth and fifth mono-multivibrators 142, 144 and brake pulse voltage defining circuit 146. The reproduction control signal is transmitted to fourth mono-multivibrator 142. Mono-multivibrator 142 is operated in response to the above-mentioned reproduction control pulse signal transmitted from input terminal 140. Mono-multivibrator 142 determines a point of time at which a tape stop signal is to be generated to control the tape location in which the special reproduction heads carry out still reproduction. An output signal (FIG. 10F) from fourth mono-multivibrator 142 is delivered to fifth mono-multivibrator 144, which in turn defines a prescribed time delay. An output signal (FIG. 10G) from fifth mono-multivibrator 144 is supplied as a brake pulse to the bases of first and fourth transistors 106, 112 at least through brake pulse voltage defining circuit 146. At this time, first and fourth transistors 106, 112 are rendered conducting in response to the high level component of the pulse signal of FIG. 10G. Reverse current flows in a direction indicated by an arrow 142, causing capstan motor 118 and capstan 54 (FIG. 1) to be thrown out of operation. As a result, magnetic tape 10 ceases to run, during which time the still reproduction included in the slow reproduction is carried out. Additionally describing, variable resistors 149-1, 149-2, 149-3, 149-4 and 149-5 are so provided at every mono-multivibrators as to adjust the time length of signals.

Figure 11:
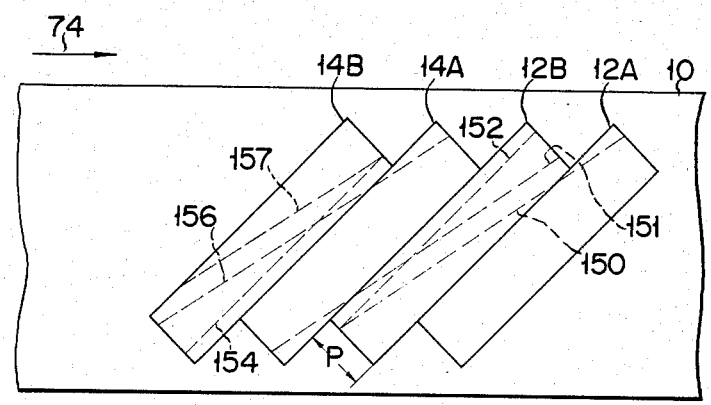
FIG. 11 indicates the loci of the central points of the reproducing heads of the reproducing device of FIG. 5 embodying the invention.

The reproduction device of this invention arranged as described above carries out the slow reproduction through the undermentioned process. Where first and fourth transistors 106, 112 of capstan drive section 64 are rendered conducting, then capstan motor 118 stops. As a result, capstan 54 interlocking with motor 118 also ceases to be driven, preventing tape 10 from running. At this time, rotary head drum 46 is rotated at a prescribed speed by head drive section 48. Accordingly, the central points of special reproduction video heads 86, 88 having the aforesaid second azimuth angle trace track 12B which similarly defines the second azimuth angle and on which the image signals of B field are recorded, along dotted lines 150, 151, 152 as shown in FIG. 11. Reproduction heads 86, 88 are set on peripheral wall 80 (FIG. 7) of head drum 46 at distance d (FIG. 8) from each other as viewed from the direction in which the rotary shaft of head drum 46 extends. Distance d is chosen to be smaller than track pitch P, as expressed by the previously shown formula (1). Therefore, that area of B field track 12B which is traced by reproduction heads 86, 88 moving along the dotted lines 150, 151 of FIG. 11, increases over the case where distance d is made equal to track pitch P, thereby enabling more image signals to be reproduced. Where second and third transistors 108, 110 of capstan drive section 64 are rendered conducting, then capstan motor 118 is driven. The torque moment of capstan motor 118 is transmitted to capstan 54 which in turn is rotated at the normal speed. As a result, magnetic tape 10 slides around head 40 at a prescribed normal speed. At this time, the central points of special reproduction heads 86, 88 respectively trace to tracks 12B, 14B of B field along dotted lines 152, 154 (FIG. 11).

In this case, that area of tracks 12B, 14B of B field which is traced by heads 86, 88 increases over the case when the aforesaid distance between said both heads 86, 88 is chosen to be zero, thereby enabling more image signals to be reproduced.

Figure 12:
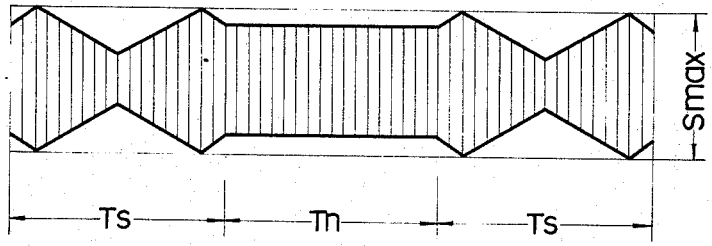
FIG. 12 shows a waveform of an image signal reproduced from the tracks of a magnetic tape according to the loci of the central points of the reproducing heads shown in FIG. 11.

Where, later, capstan motor 118 and consequently magnetic tape 10 stop, then the central points of special reproduction heads 86, 88 trace track 14B of B field along dotted lines 156, 157. The above-described operation cycle is repeated, causing all image signals related to the slow reproduction to be reproduced. An image signal reproduced at the time of the slow reproduction indicates an envelope waveform shown in FIG. 12. As a result, image signals reproduced throughout still reproduction period Ts and normal speed reproduction period Tn increase with little change in quantity, and with freedom from noises and high S/N ratio. The amount of output signals is decreased at the middle point of still reproduction period Ts. However, noises caused by the decrease of output signals are placed at edge portion of the video screen, so that the noises are easily removed from the video screen by the known means.

The present invention offers the advantages that the above-mentioned merit is substantially assured simply by mounting special reproduction heads 86, 88 on the peripheral wall of head drum 46 in such a position as is defined by the aforesaid formula (1); any other structure need not be added; and the special reproduction device can be manufactured with a simplified arrangement and at a low cost.

Figure 13:
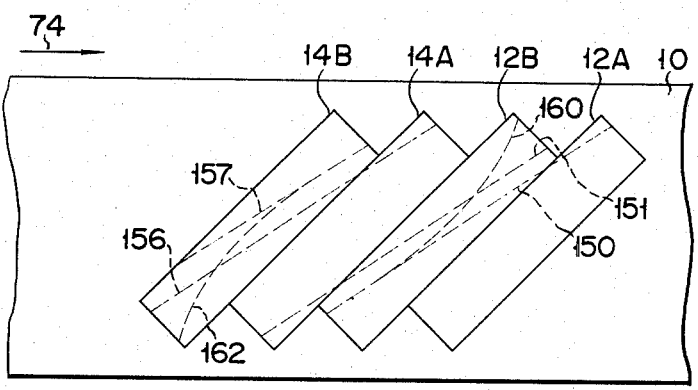
FIG. 13 shows the other loci of the central points of the reproducing heads of the special reproducing device of the invention tracing the recording tracks of a magnetic tape.
Figure 14:
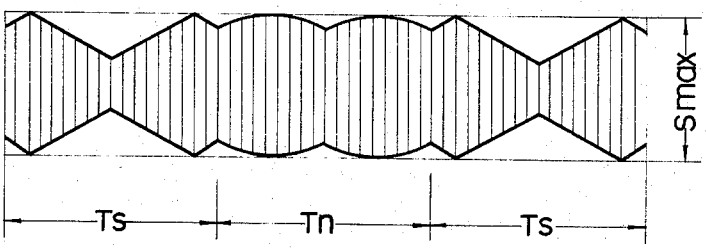
FIG. 14 is a waveform of an image signal reproduced from the tracks of a magnetic tape according to the loci of the central points of the reproducing heads of FIG. 13 embodying the invention.

Description is now given with reference to FIG. 13 of a modification of the present invention. Where magnetic tape 10 stops running, then the central points of special reproduction heads 86, 88 trace track 12B of B field along dotted lines 150, 151. Then magnetic tape 10 runs at a lower speed than that at which tape 10 makes a normal run, and thereafter travels at a higher speed than that of the normal run. Tape 10 is moved by capstan drive section 64 connected to capstan 54. The tape run is controlled twice during period Tn. As a result, the central points of reproduction heads 86, 88 trace tracks 12B, 14B of B field along curved dotted lines 160, 162. Accordingly, those areas of tracks 12B, 14B are increased which are traced by special reproduction heads 86, 88 during period Tn included in the slow reproduction period. An image signal reproduced at this time has an envelope waveform illustrated in FIG. 14. During period Tn, the envelope waveform of a reproduced image signal is changed into a waveform defined by two lines; each consisting of two contiguous outward swelling segments. It will be easily understood that these segmental waveforms result from the curved tracing of tracks 12B, 14B of B field by special reproduction heads 86, 88. At the time of slow reproduction therefore, the quantity of reproduced image signals increase approximately up to a maximum level Smax. Consequently, image signals can be reproduced with few noise components and high S/N ratio.

Although the present invention has been shown and described based on a particular embodiment, nevertheless, various changes and modifications which are obvious to a person skilled in the art to which the invention pertains are deemed to lie within the spirit, scope and contemplations of the invention.

What is claimed is:

1. A helical scanning type recording and/or reproduction apparatus which effects a slow motion reproduction consisting of a still reproduction period and a normal reproduction period, said apparatus comprising:
   (a) speed control means for controlling travel of a recording medium in such a way that said recording medium runs at a prescribed constant normal speed in a normal recording/reproduction mode and runs in a slow motion reproduction mode alternately between said normal speed and a still condition substantially corresponding to still reproduction;
   (b) a first pair of head means for normal mode recording and reproduction having different azimuth angles from each other and having the same head width, said first pair of head means for defining, at a predetermined pitch on the recording medium, a plurality of video tracks on which field image signals are magnetically recorded, neighboring ones of said tracks having different azimuth angles from one other;
   (c) a second pair of head means for special mode reproduction, said second pair of head means each having the azimuth angle of the same one of said first pair of head means, for reproducing the image signals recorded on the video tracks having the same azimuth angles as those of said second pair of head means, said second pair of head means having the same head width as that of said first pair of head means;
   (d) head-supporting means, defining first and second parallel circumferential lines spaced from each other by a prescribed distance d which is greater than zero but less than one pitch of said video tracks, for (i) supporting said first pairs of heads means in such a manner that each head of said first pair of head means is diametrically positioned with respect to the other and aligned with said first circumferential line, and (ii) supporting said second pair of head means in such a manner that each head of said second pair of head means is diametrically positioned with respect to the other, wherein one head of said second pair of head means is aligned with said first circumferential line and the other head of said second pair of head means is aligned with said second circumferential line so that said one head and said other head of said second pair of head means are spaced apart by said distance d; and
   (e) rotating means, operatively connected to said supporting means, for, (i) in the still reproduction period included in said slow motion reproduction, causing said second pair of head means to trace an aimed video track during said still condition having an azimuth angle equal to that of said second pair of head means, said aimed track including first and second paths spaced from one other by said predetermined distance d and inclined with respect to said aimed video track, thereby increasing the tracing area of said aimed video track traced by said second pair of head means, and for, (ii) in the subsequent normal reproduction period included in said slow motion reproduction, causing one of said second pair of head means to slide on said aimed video track along a third path parallel to said aimed video track having substantially the same width as the head of said second pair of head means and a tracing deviation width smaller than the half of the width of said aimed video track, thereby maximizing the image signal level reproduced during the still reproduction period during said normal reproduction period included in said slow motion reproduction.

2. A reproduction device according to claim 1, wherein said head-supporting means includes a cylindrical member having a peripheral wall, and said second pair of head means are mounted on the peripheral wall of said cylindrical member in a state diametrically positioned with respect to each other.

3. A reproduction device according to claim 1, wherein said second pair of head means have the same azimuth angle with respect to each other.

4. A reproduction device according to claim 1, wherein said speed control means includes:
roller means for slidably contacting the recording medium;
capstan means which associates with said roller means for clamping the recording medium therewith, said capstan means being so rotated at a prescribed speed as to cause the recording medium to run; and
capstan drive means which is coupled with said capstan means to define the rotating speed of said capstan means.

5. A reproduction device according to claim 4, wherein the recording medium is subjected to still tracing by said second pair of head means when set at the first speed of zero, and subjected to normal speed tracing by said second pair of head means when set at the second speed equal to the normal reproduction speed.

6. A reproduction device according to claim 5, wherein the second speed at which the recording medium is traced by said second pair of head means is chosen to be any level higher than zero and changes with time.

7. A reproduction device according to claim 6, wherein said second pair of head means move on the surface of the recording medium so as to form curved loci in accordance with changes in the second speed of the recording medium.

8. A reproduction device according to claim 1, wherein when each head of said second pair of head means has a head width which is so set as to be substantially equal to one track pitch of the video track, said distance between the loci being selected to be smaller than 0.3 P, where P represents amount of one track pitch.

9. A system for storing information on and recovering information from a magnetic recording medium, comprising:
means for magnetically imprinting a moving magnetic recording medium with plural substantially parallel tracks each of which define a segment of information to be stored thereon, said imprinting means including first recording head means for imprinting alternate ones of said tracks, said first recording head means including means for defining a gap with a first azimuth angle;
means for alternately transporting said medium a predetermined distance and halting said medium;
first reproducing head means for scanning a first of the ones of said plural tracks imprinted by said first recording head means along a first path while said medium is halted and for scanning said first track along a third path different from said first path while said medium is being transported, said first reproducing head means including means for defining a gap with said first azimuth angle;
second reproducing head means, fixed in position relative to said first reproducing head means, for scanning said first track along a second path parallel to said first path and displaced from said first path by a predetermined distance d while the movement of said magnetic medium is halted and for scanning a second of the ones of said plural tracks imprinted by said first recording head means along a fourth path while said medium is being transported, said second reproducing head means including means for defining a gap with said first azimuth angle.

10. A system as in claim 9 wherein:
said third path traverses the entire length of said first track; and
said fourth path traverses the entire length of said second track.

11. A system as in claim 10 further including:
a rotatable head assembly;
means for fixing said first and second reproducing head means to said assembly at positions displaced from one another, in the direction of rotation of said head assembly, by an angle of 180° and, in a direction axial to said assembly, by a predetermined distance d; and
means for rotating said head assembly at a predetermined angular velocity.

12. A method as in claim 9 wherein said transporting means includes means for transporting said medium a distance equal to the width of two adjacent ones of said plural tracks.

13. A system as in claim 9 wherein said predetermined distance d is less than the width of said first track.

14. A system as in claim 9 wherein said magnetically imprinting means further includes second recording head means for magnetically imprinting the ones of said plural tracks not imprinted by said first recording head means, said second recording head means including means for defining a gap with a second azimuth angle different from said first azimuth angle.

15. A system as in claim 9 wherein said magnetically imprinting means imprints adjacent ones of said plural tracks contiguously on said medium.

16. A method for storing information on and recovering information from a magnetic recording medium, comprising the steps of:
(1) magnetically imprinting a moving magnetic recording medium with plural substantially parallel tracks each of which define a segment of information to be stored thereon, said imprinting step (1) including the step of imprinting alternate ones of said tracks with a first recording head including means for defining a gap with a first azimuth angle;
(2) halting the movement of said magnetic medium;
(3) during said halting step (2), scanning a first of the ones of said plural tracks imprinted by said first azimuth angle recording head along a first path with a first reproducing head including means for defining a gap with said first azimuth angle;
(4) also during said halting step (2), scanning said first track along a second path parallel to said first path and displaced from said first path by a predetermined distance d with a second reproducing head fixed in position relative to said first reproducing head, said second reproducing head including means for defining a gap with said first azimuth angle;

(5) transporting said medium a predetermined distance;

(6) during said transporting step (5), scanning said first track along a third path different from said first and second paths with one of said first and second reproducing heads;

(7) also during said transporting step (5), scanning a second of the ones of said plural tracks imprinted by said first azimuth angle recording head along a fourth path with the other one of said first and second reproducing heads; and (8) repeating said steps of (2), (3) and (4) for said second track.

17. A method as in claim 16 wherein:

said scanning step (6) comprises the step of scanning along the entire length of said first track; and said scanning step (7) comprises the step of scanning along the entire length of said second track.

18. A method as in claim 16 wherein:

said first and second reproducing heads are fixed to a rotatable head assembly at positions displaced from one another, in the direction of rotation of said head assembly, by an angle of 180° and, in a direction axially to said assembly, by a predetermined distance d; and said scanning steps, ((3), (4), (6) and (7) each include the step of rotating said head assembly 180°.

19. A method as in claim 16 wherein said transporting step (5) comprises the step of transporting said medium a distance equal to the width of two adjacent ones of said plural tracks.

20. A method as in claim 16 wherein said predetermined distance d is less than the width of said first track.

21. A method as in claim 16 further including the step of repeating steps (2)-(8) for a plurality of sets of said tracks imprinted by said first recording head.

22. A method as in claim 16 wherein said imprinting step (1) further includes the step of magnetically imprinting the ones of said plural tracks not imprinted by said first recording head with a second recording head including means for defining a gap with a second azimuth angle different from said first azimuth angle.

23. A method as in claim 16 wherein said imprinting step (1) includes the step of imprinting adjacent ones of said plural tracks contiguously on said medium.

24. A method of recovering information from a magnetic recording medium imprinted with plural substantially parallel contiguous tracks each of which define a segment of information, alternate ones of said tracks imprinted with a recording head including means for defining a gap with a first azimuth angle, said method comprising the steps of:

(1) controlling a transport mechanism to halt the movement of said recording mediums;

(2) while the movement of said recording medium is halted, scanning a first of the ones of said plural tracks imprinted by said first azimuth angle recording head along a first path with a first reproducing head including means for defining a gap with said first azimuth angle;

(3) also while the movement of said recording medium is halted, scanning said first track along a second path parallel to said first path and displaced from said first path by a predetermined distance d with a second reproducing head fixed in position relative to said first reproducing head, said second reproducing head including means for defining a gap with said first azimuth angle;

(4) controlling said transport mechanism to transport said medium a predetermined distance;

(5) while said medium is being transported, scanning said first track along a third path different from said first and second paths with one of said first and second reproducing heads;

(6) also while said medium is being transported, scanning a second of the ones of said plural tracks imprinted by said first azimuth angle recording head along a fourth path with the other one of said first and second reproducing heads; and (7) repeating steps (1)-(3) for said second track.

25. A method as in claim 24 wherein:

said scanning step (5) includes the step of scanning the entire length of said first track; and said scanning step (6) includes the step of scanning the entire length of said second track.

26. A method as in claim 24 wherein:

said first and second reproducing heads are fixed to a rotatable head assembly at the positions displaced from one another, in the direction of rotation of said head assembly by an angle of 180° and, in a direction axial to said assembly, by said predetermined distance d; and said scanning steps (2), (3), (5) and (6) each include the step of rotating said head assembly 180°.

27. A method as in claim 24 wherein said controlling step (4) comprises the step of controlling said transport mechanism to displace said medium a distance equal to the width of two adjacent ones of said plural tracks.

28. A method as in claim 24 wherein said predetermined distance d is less than the width of each of said plural tracks.

29. A method as in claim 24 further including the step of repeating steps (1)-(7) for a plurality of sets of said tracks imprinted by said first azimuth angle recording head.

* * * * *